United States Patent
Jackson (10) Patent No.: US 7,218,648 B1
(45) Date of Patent: May 15, 2007

(54) METHOD AND APPARATUS FOR COMMUNICATING CONTROL DATA IN AN ASYNCHRONOUS COMMUNICATIONS CHANNEL

(75) Inventor: J. Timothy Jackson, Seattle, WA (US)

(73) Assignee: Terabeam Corporation, San Jose, CA (US)

( * ) Notice: Subject to any disclaimer, the term of this patent is extended or adjusted under 35 U.S.C. 154(b) by 1232 days.

(21) Appl. No.: 10/087,399

(22) Filed: Mar. 1, 2002

(51) Int. Cl.
*H04J 3/12* (2006.01)

(52) U.S. Cl. .................. 370/528; 370/522; 370/445; 370/467

(58) Field of Classification Search ................ 370/522, 370/528, 445, 466, 467
See application file for complete search history.

(56) References Cited

U.S. PATENT DOCUMENTS

| | | | |
|---|---|---|---|
| 5,577,069 A * | 11/1996 | Lau et al. ............... | 375/242 |
| 5,784,559 A * | 7/1998 | Frazier et al. ........... | 370/522 |
| 6,763,195 B1 * | 7/2004 | Willebrand et al. ..... | 398/115 |
| 6,778,551 B1 * | 8/2004 | Oh ........................ | 370/445 |
| 7,089,485 B2 * | 8/2006 | Azadet et al. .......... | 714/798 |
| 2001/0036181 A1 * | 11/2001 | Rogers .................. | 370/389 |
| 2002/0061012 A1 * | 5/2002 | Thi et al. ............... | 370/352 |
| 2002/0063932 A1 * | 5/2002 | Unitt et al. ............ | 359/168 |
| 2002/0109887 A1 * | 8/2002 | Aburakawa et al. .... | 359/172 |
| 2002/0126967 A1 * | 9/2002 | Panak et al. ........... | 385/101 |
| 2002/0191598 A1 * | 12/2002 | Mays .................... | 370/386 |

OTHER PUBLICATIONS

IEEE Project 802.3 Working Group Standards Status, p. 1, Jul. 9, 2001.
Cisco Systems, Ethernet Technologies, Downloaded from www.cisco.com/univercd/cc/td/doc/cisintwk/ito_doc/ethernet.htm, pp. 1-33, Posted Feb. 20, 2002.
Suzuki, Hiroshi et al., OAM on Ethernet Preamble, Power Point Presentation from METRO Ethernet Forum, pp. 1-21, Feb. 2002 MEF meeting.

* cited by examiner

*Primary Examiner*—Wing Chan
*Assistant Examiner*—Andrew C. Lee
(74) *Attorney, Agent, or Firm*—Townsend and Townsend and Crew LLP (57) ABSTRACT

A communication system communicates control data in unused segments in the data stream of an asynchronous channel. The communication system includes a transmitting unit and a receiving unit. The transmitting unit transmits communications data to the receiving unit via the asynchronous channel, in compliance with the channel's asynchronous protocol. However, the transmitting unit transmits control data to the receiving unit in unused segments of the data stream.

22 Claims, 5 Drawing Sheets

METHOD AND APPARATUS FOR COMMUNICATING CONTROL DATA IN AN ASYNCHRONOUS COMMUNICATIONS CHANNEL

FIELD OF THE INVENTION

The field of invention relates to communication systems in general; and, more specifically, to control data communication in an asynchronous channel.

BACKGROUND

Many communication systems asynchronously communicate data over a communications channel. For example, in many network applications, the communication channel is designed to comply with the IEEE std. 802.3-2000, published October, 2000. Although the IEEE 802.3 standard (also referred to herein as the Ethernet standard) is in wide use, there are many other asynchronous communications channels such as, for example, Asynchronous Transfer Mode (ATM), Packet over SONET (POS), Token Ring, and Fiber Channel.

Transmitter, receiver and/or transceiver units used in such communication systems often communicate control data (including diagnostic, synchronization and configuration, and other types of data used in managing the units) among each other. In many conventional communication systems, this control data is communicated in the same manner as normal communications data. For example, in an Ethernet channel, the control data would be communicated using data frames that comply with the Ethernet standard. As a result, each data frame used to transfer control data cannot be used for normal communications data, thereby reducing the effective bandwidth of normal communications data.

SUMMARY OF THE INVENTION

In accordance with aspects of the present invention, a communication system is provided that communicates control data in unused segments in the data stream of an asynchronous channel. The communication system includes a transmitting unit and a receiving unit. The transmitting unit transmits communications data to the receiving unit via the asynchronous channel, in compliance with the channel's asynchronous protocol. However, the transmitting unit transmits control data to the receiving unit in unused segments of the data stream.

In another aspect of the present invention, the asynchronous channel is an Ethernet channel, with the unused segments being the inter-frame gap (IFG) specified in the Ethernet standard.

In still another aspect of the invention, the unused segments are idle segments in the data stream. For example, if the channel is an Ethernet channel, the transmitting unit may be controlled to transmit "idle periods" as specified in the Ethernet standard. The transmitting unit can detect such idle periods and insert control data in the data portions of the frame. In some embodiments, control data can be inserted in both IFGs and idle periods.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
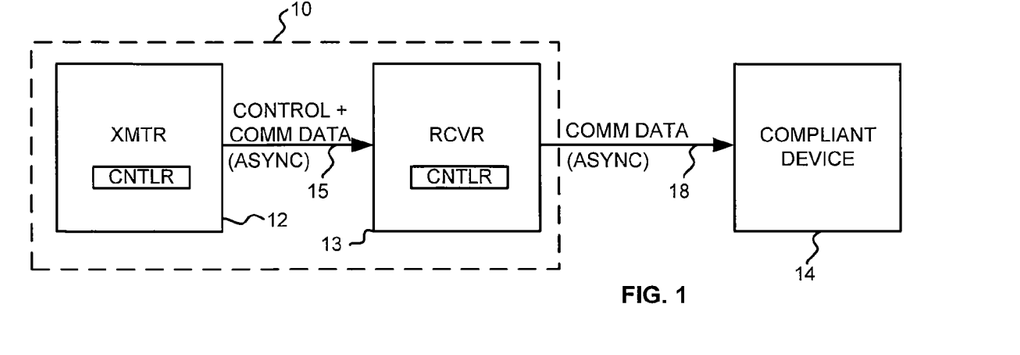
FIG. 1 is a block diagram illustrating a basic communication system, according to one embodiment of the present invention.

FIG. 1 illustrates a basic communication system 10, according to one embodiment of the present invention. In this embodiment of the invention, communication system 10 includes a transmitter 12 and a receiver 13. In addition, communication system 10 can include a compliant device 14 (or several compliant devices). Transmitter 12 and receiver 13 communicate over a channel 15 that is asynchronous. For example, channel 15 may support communication according to the aforementioned IEEE 802.3 standard or other CSMA (carrier sense multiple access) or CSMA/CD (CSMA/collision detection) protocols, including older versions and likely updates to the Ethernet standard.

In one embodiment, transmitter 12 and receiver 13 are free space optical (FSO) units. In other embodiments, transmitter 12 and receiver 13 may communicate over any suitable wired or wireless media. Transmitter 12 and receiver 13 include controllers 16 and 17, respectively. In accordance with the present invention, controllers 16 and 17 are configured so that transmitter 12 and receiver 13 can exchange control data by multiplexing portions of the control data in unused segments in the data stream. In some embodiments, these control data exchanges need not fully comply with the all off the requirements of the protocol. For example, when channel 15 is an Ethernet channel, the control data portions may be inserted in the inter-frame gap (IFG) or following an idle pattern, which are both specified in the aforementioned Ethernet standard.

Compliant device 14 is a device that communicates with receiver 13 via an asynchronous channel 18. In this optional embodiment of communication system 10, communications between compliant device 14 and receiver 13 should fully comply with the protocol being used for channel 18. In some embodiments, channels 15 and 18 use the same protocol or standard (e.g., Ethernet), although in other embodiments channels 15 and 18 may use different protocols or standards.

Figure 2:
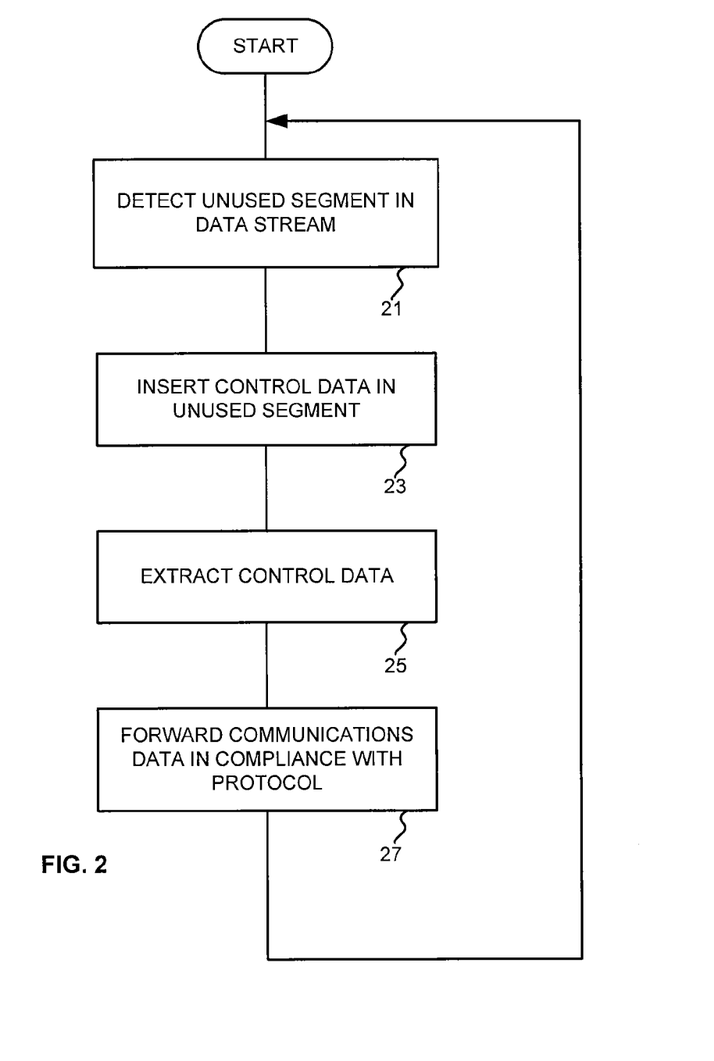
FIG. 2 is a flow diagram illustrating the operational flow of the communication system of FIG. 1.

FIG. 2 illustrates the operational flow of communication system 10 (FIG. 1). Referring to FIGS. 1 and 2, communication system 10 operates as follows according to one embodiment of the present invention.

In basic operation, transmitter 12 transmits a data stream to receiver 13 via channel 15. In particular, transmitter 12 transmits normal communications data according to the protocol or standard of channel 15. Receiver 13 receives the data stream and extracts the embedded communications data. Because the protocol of channel 15 is asynchronous, the data stream will have segments that are unused (also referred to herein as idle periods).

These unused segments in the data stream are then detected. In one embodiment, transmitter 12 detects such unused segments in the data stream. For example, in an Ethernet embodiment, controller 16 of transmitter may be configured to monitor frames in the data stream for idle patterns. In another embodiment, controller 16 detects the end of a frame (i.e., the beginning of an IFG). This operation is represented by a block 21.

If there is control data to transmit to receiver, some control data is inserted in the data stream via an unused segment. In one embodiment, transmitter 12 multiplexes some control data in an unused segment, between frames containing communications data. Continuing the Ethernet example above, controller 16 may be configured to multiplex control data into (a) the IFG following a frame containing communications data; and/or (b) into a segment following the detection of an idle pattern (or the detection of N consecutive idle patterns, where N represents an integer greater than one). This operation is represented by a block 23.

The control data is then extracted from the data stream in receiver 13. In one embodiment, controller 17 is configured to detect control data that is inserted in the data stream. For example, in an Ethernet embodiment, controller 17 may be configured to detect data inserted in the IFG. Alternatively or in addition, controller 17 may be configured to detect an idle pattern and extract the control data, if any, that follows the idle pattern. In this embodiment, receiver 13 then processes the extracted control data as is commonly done in conventional systems. This operation is represented by a block 25.

The communications data is extracted from the data stream. In this embodiment, controller 17 is configured to extract the communications data from the data stream. In the embodiments having compliant device 14, receiver 13 passes the communications data to compliant device 14 via channel 18. As previously described, communications over channel 18 fully comply with the protocol of channel 18. For example, channel 18 may also be an Ethernet channel. Receiver 13 would transmit the extracted communications in compliance with the Ethernet standard (e.g., with the IFG restored and having no control data). This operation is represented by a block 27. The operational flow then returns to block 21.

Although FIG. 2 shows the operations as being sequentially performed in the indicated order, the operations can be performed in different sequences. For example, the operations of blocks 21 and 23 are performed essentially independently of blocks 25 and 27. Thus, for example, one or more iterations of blocks 21 and 23 may be performed to communicate control data before blocks 25 and 27 are performed in which the control data is extracted. For example, receiver 13 may receive the control data and buffer it before processing the control data.

Figure 3:
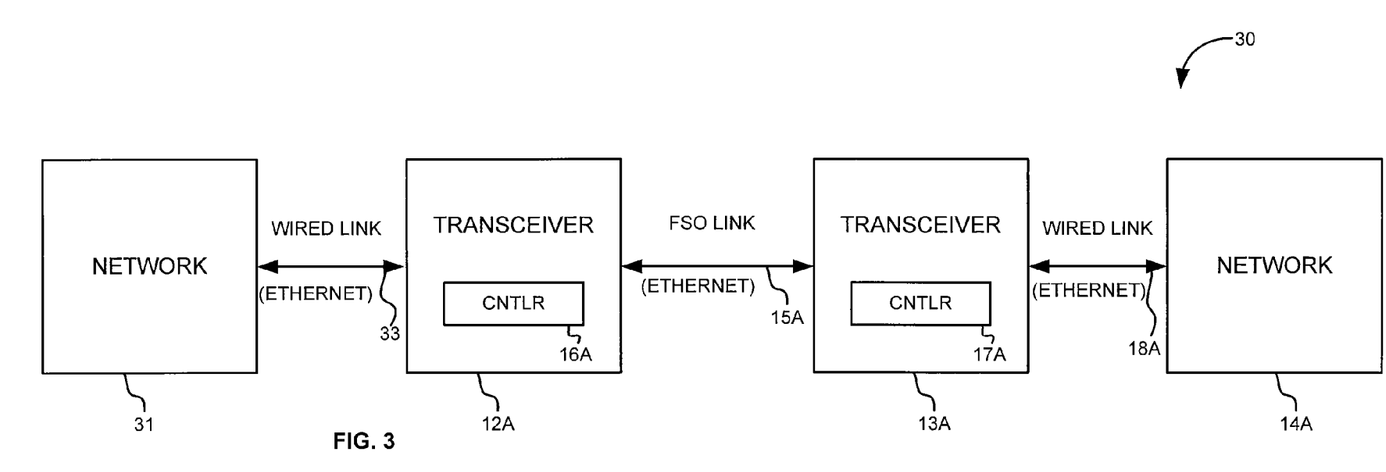
FIG. 3 is a block diagram illustrating a communication system with a free space optical link, according to one embodiment of the present invention.

FIG. 3 illustrates a communication system 30 with a free space optical (FSO) link, according to one embodiment of the present invention. In this embodiment, communication system 30 includes a network 31, a transceiver 12A, a transceiver 13A and another network 14A. Transceivers 12A and 13A include controllers 16A and 17A, respectively. Communication system 30 is an expansion of communication system 10 (FIG. 1) in that transmitter 12 and receiver 13 are expanded to transceivers (i.e., transceivers 12A and 13A), and compliant device 14 is expanded to a network (i.e., network 14A). These transceivers provide a link between networks 31 and 14A.

The elements of communication system 30 are interconnected as follows. Network 31 is connected to transceiver 12A via a channel 33, which is wired in this embodiment. Transceiver 12A is connected to transceiver 13A via FSO channel 15A. Although in this embodiment channel 15A is a FSO link, in other embodiments channel 15A may be implemented in any suitable media (e.g., optical fiber, twisted pair, RF, cable, etc.). Transceiver 13A is also connected to network 14A via a channel 18A, which is a wired channel in this embodiment. In this exemplary embodiment, channels 33, 15A and 18A and networks 31 and 14A all comply with the Ethernet standard. In other embodiments, these channels and networks may use any suitable asynchronous protocol or standard. Basically, transceivers 12A and 13A function as devices on networks 31 and 14A, respectively.

In application, communication system 30 can be used, for example, to link a network in one location to a network in another location. Channel 15A supports FSO communication between networks 31 and 14A via transceivers 12A and 13A.

Figure 4:
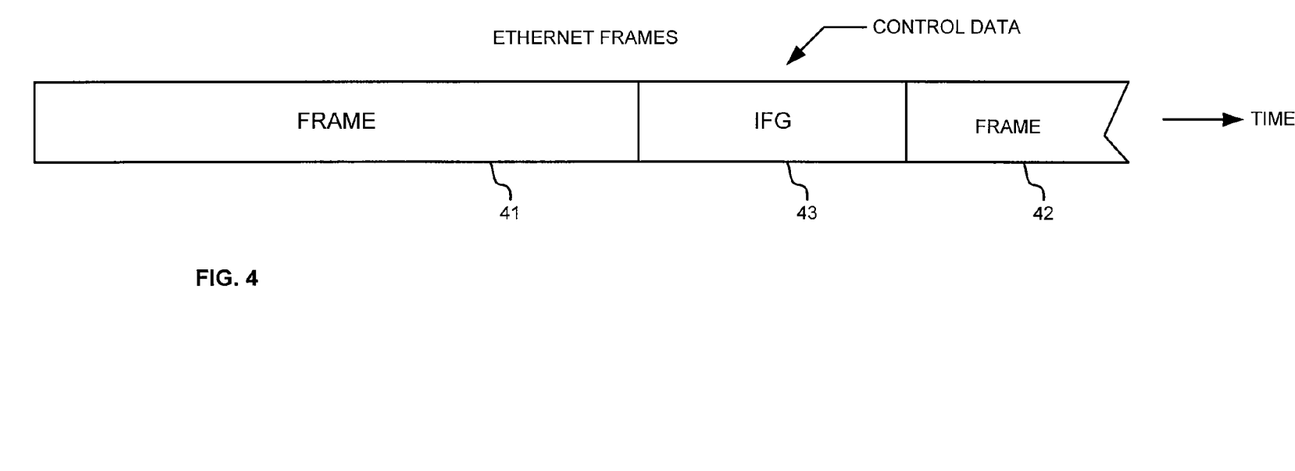
FIG. 4 is a diagram illustrating an inter-frame gap of an Ethernet channel.

As previously described, the Ethernet standard specifies a minimum spacing between frames commonly referred to as the IFG). FIG. 4 illustrates an IFG of an Ethernet channel. More particularly, when a transmitting unit transmits a frame 41, the Ethernet standard specifies that the next frame 42 can only be transmitted after IFG 43 has transpired. The IFG is currently specified as the time needed to transmit 96 "bits" over the channel. As will be described in more detail in conjunction with FIG. 5, a transmitting unit may transmit control data in IFG 43.

Figure 5:
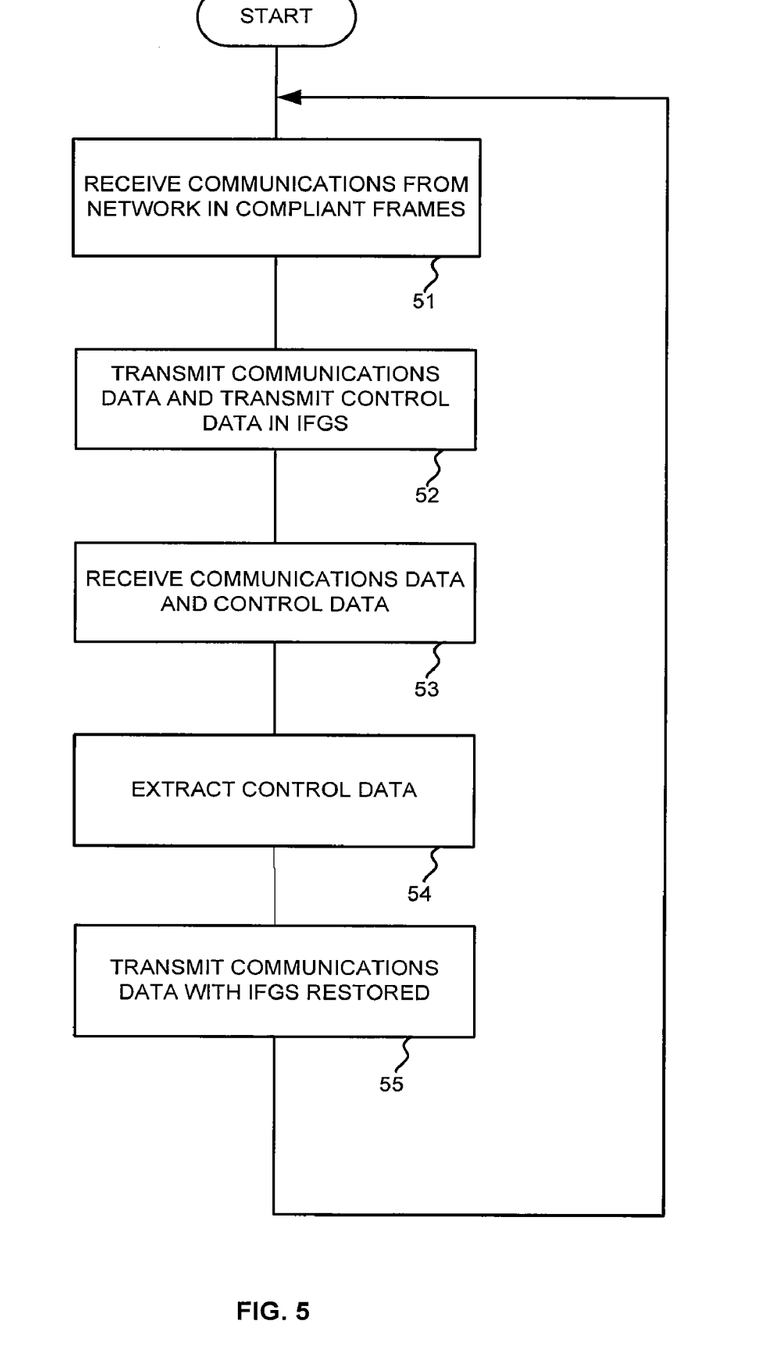
FIG. 5 is a flow diagram illustrating the operational flow of the communication system depicted in FIG. 3, according to another embodiment of the present invention.

FIG. 5 illustrates an operational flow of communication system 30 (FIG. 3), according to an embodiment of the present invention. Referring to FIGS. 3 and 5, communication system 30 operates as follows in communicating control data between transceivers 12A and 13A during IFGs.

Communications data is received by a transceiver from a device in the network connected to the transceiver. For example, a device in network 31 can send communications data that is intended for a device in network 14A. This communications data is received in an Ethernet compliant frame by transceiver 12A, via channel 33. This operation is represented by a block 51 in FIG. 5.

The communications data is transmitted to the other transceiver (i.e., receiving transceiver in this example communication exchange) over channel 15A. Control data, if any, is inserted in the IFG following the frame of communications data. Continuing the above example, the communications data received by transceiver 12A is transmitted to transceiver 13A via FSO channel 15A in an Ethernet compliant frame.

In addition, if transceiver 12A has control data to send to transceiver 13A, transceiver 12A may add the control data to the data stream by inserting at least a part of the control data in the IFG following the frame of communications data. In one embodiment, transceiver 13A detects when IFGs occur by detecting idle periods (as described, for example, in conjunction with FIG. 6). Although this communication exchange may be inconsistent with the Ethernet standard, this inconsistency is transparent to devices on networks 31 and 14A. This operation is represented by a block 52.

The communication and control data is received by the receiving transceiver via FSO channel 15A. Continuing the above example, transceiver 13A receives the communications data in an Ethernet compliant frame and the control data in the following IFG. This operation is represented by a block 53.

The control data is then extracted from the received data. In the above example, transceiver 13A extracts the control data from the IFG and processes it in accordance with a predetermined set of rules. This operation is represented by a block 54.

The communications data is then transmitted to the network containing the device to receive the communications data. Continuing the above example, transceiver 13A then transmits the communications data to network 14A via channel 18A, in an Ethernet compliant frame. Transceiver 13A then waits unit the IFG transpires before sending another frame. Thus, in accordance with the present invention, the communication of control data between transceivers 12A and 13A is transparent to devices on networks 31 and 14A. This operation is represented by a block 55. Although block 55 is shown in FIG. 5 as being performed before block 54, a transceiver can perform these operations essentially in parallel. The operational flow returns to block 51 so that one of the transceivers can receive a next frame of communications data.

Figure 6:
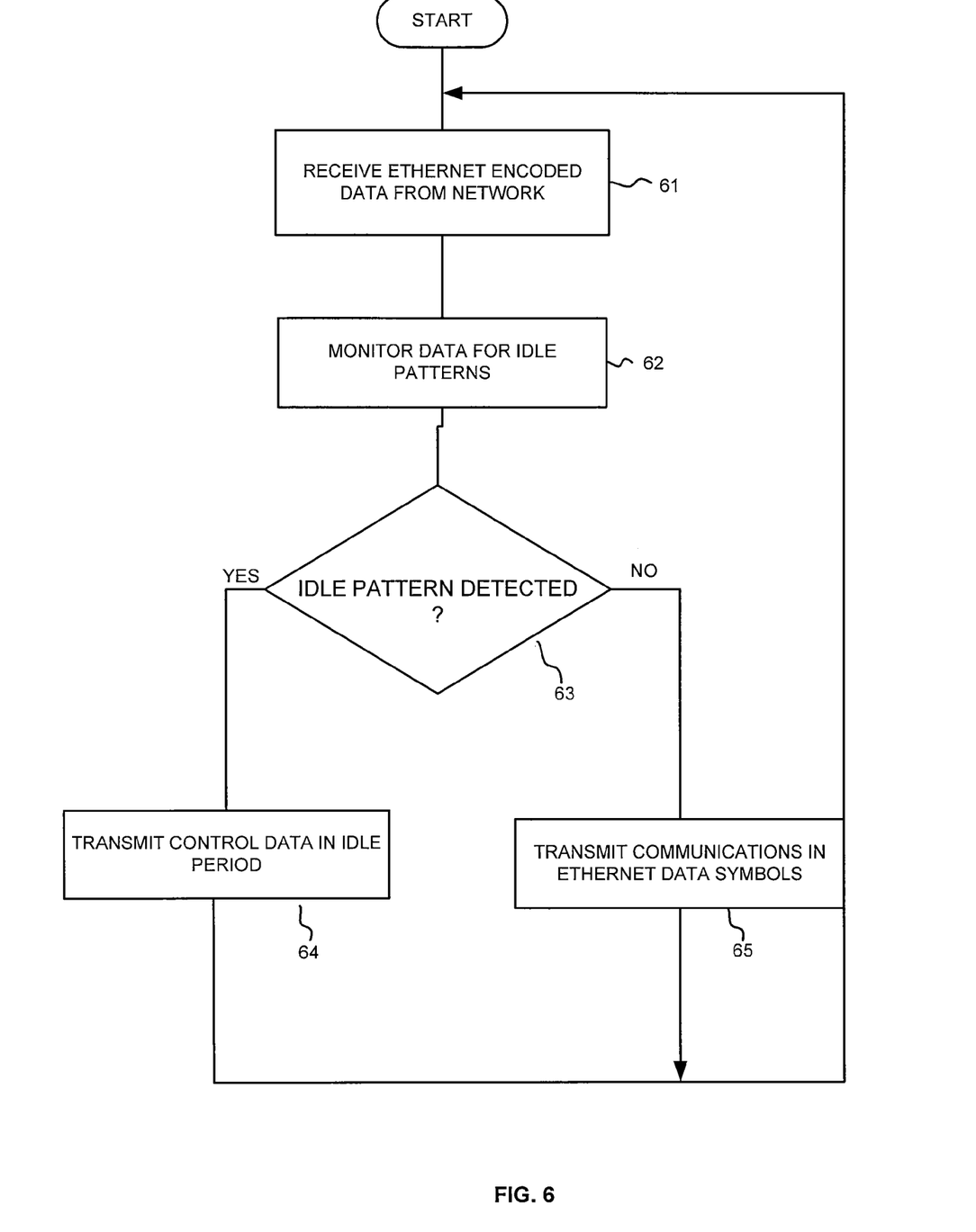
FIG. 6 is a flow diagram illustrating the operational flow in multiplexing control data in idle periods in an Ethernet data stream.

FIG. 6 illustrates the operational flow of communication system 30 in multiplexing control data in idle periods in an Ethernet data stream, according to one embodiment of the present invention. Referring to FIGS. 3 and 6, communication system 30 performs this operation as follows. A transceiver receives Ethernet encoded data from a device in the network to which the transceiver is connected. For example, transceiver 13A may receive Ethernet encoded data from a device of network 14A. This operation is represented by a block 61.

The received data is monitored to determine whether the received data comprises an Ethernet compliant idle period. Continuing the above example, transceiver 13A checks the code words (specified in the aforementioned IEEE 802.3 Standard) of the received data for the pattern assigned to an idle period. More specifically, the code words are part of a five-bit/four-bit coding scheme that indicates the nature of the data. In the current Ethernet standard, the five-bit code word for an idle period is defined by the five consecutive bits "11111". Thus, in this example, transceiver 13A monitors the data stream to detect when a device of network 14A sends data to transceiver 13A that is representative of an idle period. Communication system 30 can also support control data flow in the opposite direction using this idle period technique. This operation is represented by blocks 62 and 63.

If an idle period is detected, control data is inserted in the idle period. Continuing the above example, if transceiver 13A detects an idle pattern in the data, transceiver 13A inserts a portion of control data (e.g., a word) in the space occupied by the idle period. Transceiver 13A then transmits this data to transceiver 12A via FSO channel 15A. This operation is represented by a block 64.

In an alternative embodiment, the transceiver waits for two consecutive idle patterns (or any preselected number of consecutive idle patterns) before inserting control data in the space occupied by an idle period. In this way, a byte of control data is sent to the other transceiver.

However, if in block 63, an idle pattern in not detected, the communications data is transmitted in an Ethernet compliant frame over channel 15A. Continuing the above example, transceiver 13A would transmit the communications data received in block 61 to transceiver 12A via FSO channel 15A in Ethernet compliant data symbols. This operation is represented by a block 65. The operational flow then returns to block 61 to allow a transceiver to receive a next segment of communications data from one of the networks.

Figure 7:
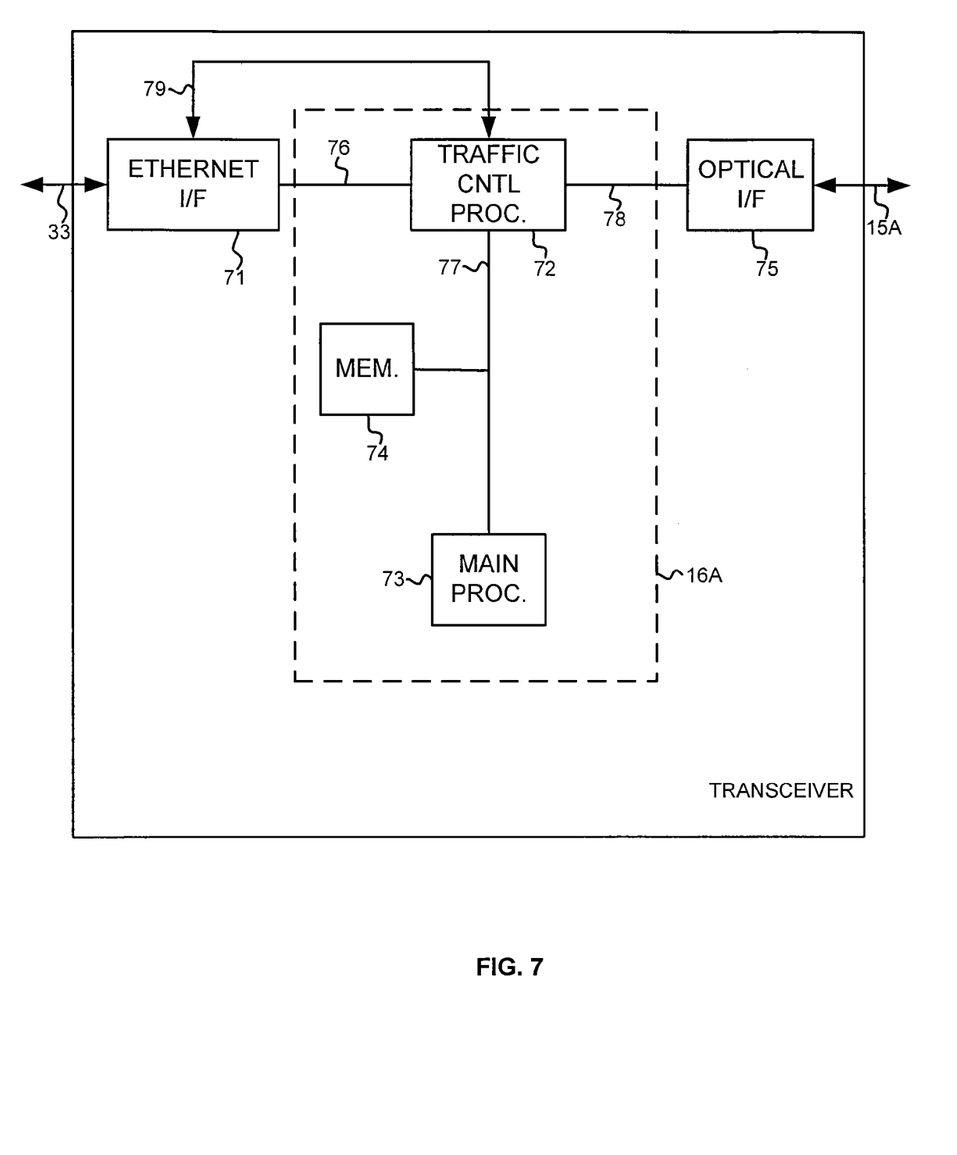
FIG. 7 is a block diagram illustrating a transceiver as depicted in FIG. 3, according to one embodiment of the present invention.

FIG. 7 is a block diagram illustrating an implementation of transceiver 12A (FIG. 3), according to one embodiment of the present invention. Transceiver 13A (FIG. 3), in one embodiment, is essentially identical in hardware implementation to this embodiment of transceiver 12A. Referring back to FIG. 7, in this embodiment, transceiver 12A includes an Ethernet interface 71, a traffic control processor 72, a management processor 73, a memory 74 and an optical interface 75. Traffic control processor 72, management processor 73 and memory 74 form part of controller 16A (FIG. 3).

Ethernet interface 71 is the physical layer interface that is configured to receive Ethernet data from an Ethernet channel and place it in a form that is usable by transceiver 12A. In addition, Ethernet interface 71 is also configured to take data from transceiver 12A and transmit it over the Ethernet channel in a format compliant with the Ethernet standard.

Traffic control processor 72 is a processor configured to process and/or control the flow of communications and control data in and out of transceiver 12A. Management processor 73 is a processor configured to control diagnostic and other control functions of transceiver 12A (i.e., functions separate from the handling of communications data to and from channels 33 and 15A). In some embodiments, a single microprocessor or microcontroller device may be used to implement both traffic control processor 72 and management processor 73.

Memory 74 includes memory devices such as, for example, random access memory (RAM) devices and non-volatile memory devices to store data, configuration information, programs, instructions, etc. used by the processors 72 and 73, as is common in computers and computer controlled systems.

Optical interface 75 is a physical layer interface that is configured to receive Ethernet data from a FSO channel and place it in a form that is usable by transceiver 12A. In addition, optical interface 75 is also configured to take data from transceiver 12A and transmit it over the FSO channel (in Ethernet compliant data symbols in this embodiment).

The elements of this embodiment of transceiver 12A are interconnected as follows. Ethernet interface 71 is connected to channel 33 and to traffic control processor 72 via a line 76. Traffic control processor 72 is connected to management processor 73 and memory 74 via a line 77, and to optical interface 75 via a line 78. Management control processor 73 is also connected to memory 74 via line 77. Optionally, Ethernet interface 71 is connected to traffic control processor 72 via a line 79. The term "line" as used in this context can refer to multiple lines (e.g., a bus) as well as a single line.

TRANSCEIVER OPERATION

Transceiver 12A handles the flow of data from channel 33 to FSO channel 15A as follows. Communications data from network 31 (FIG. 3) is received by Ethernet interface 71 via channel 33 and provides the communications data to traffic control processor 72 via line 76.

Ethernet interface 71 monitors incoming data from channel 33 for idle patterns (e.g., as described above in conjunction with FIG. 6). If Ethernet interface 71 detects a preselected number of consecutive idle patterns (which can be a single idle pattern in some embodiments), Ethernet interface 71 sends an interrupt signal to traffic control processor 72 via line 79.

Traffic control processor 72 provides the communications data to optical interface 75 via line 78. In addition, traffic control processor 72 inserts control data, if any, received from management processor 73 to be transmitted to transceiver 13A via channel 15A in unused segments of the data stream. For example, management processor 73 can provide control data as previously described in conjunction with FIGS. 3–5.

In one embodiment, control data from management processor 73 can be stored in a cache integrated on the processor device implementing traffic control processor 72. Thus, traffic control processor 72 can check to see if the cache is populated (thereby indicating that there is control data to be transmitted) and sends a signal to Ethernet interface 71 to monitor incoming data from channel 33 for idle patterns.

Optical interface 75 then generates an optical signal that encompasses the Ethernet communications and control data provided by traffic control processor 72. This optical signal is transmitted to transceiver 13A via FSO channel 15A.

Transceiver 12A handles the flow of data from FSO channel 15A to channel 33 as follows. Data received via channel 15A can include communications data from network 14A (FIG. 3) via transceiver 13A. In addition, this data may include control data from transceiver 13A. Transceiver 13A transmits this communications and control data over FSO channel 15A in essentially the same manner as described above for transceiver 12A.

Communications data from network 14A (FIG. 3) is received by optical interface 75 via channel 15A. Optical interface 75 provides the communications and control data to traffic control processor 72 via line 78.

Traffic control processor 72 extracts the communications data and provides it to Ethernet interface 71 via line 76. In addition, traffic control processor 72 extracts control data, if any, and provides it to management processor 73 via line 77. Management control processor 73 can then perform diagnostic or other management or control functions in response to this control data.

Ethernet interface 71 receives the extracted communications data from traffic control processor 72 and transmits this communications data via channel 33 in Ethernet compliant frames.

Embodiments of method and apparatus for communicating control data in an asynchronous communications channel are described herein. In the above description, numerous specific details are set forth (e.g., of processors, interfaces, protocols, etc.) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Thus, embodiments of this invention may be used as or to support a software program executed upon some form of processing core (such as a digital signal processor (DSP) or the CPU of a computer) or otherwise implemented or realized upon or within a machine-readable medium. A machine-readable medium includes any mechanism for storing or transmitting information in a form readable by a machine (e.g., a DSP or other computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A communication system, comprising:
    a receiving unit;
    a transmitting unit operatively coupled to the receiving unit via a first channel, the transmitting unit being configurable to transmit a first data stream to the receiving unit in the first channel, the first data stream containing communications data and control data, wherein the transmitting unit transmits the first data stream so that communications data is transmitted in a grouping that complies with an asynchronous protocol and the control data is transmitted within a segment of the first data stream that is specified as unused for communications data according to the asynchronous protocol;
    wherein the receiving unit extracts communications data from the grouping in the first data stream and extracts control data from the segment in the first data stream; and
    a device coupled to the receiving unit, wherein the device is configured to exchange communications data with the receiving unit over a second channel in a second data stream conforming to the asynchronous protocol.

2. The communication system of claim 1 wherein the asynchronous protocol conforms to an Ethernet standard and the grouping is an Ethernet compliant frame.

3. The communication system of claim 1 wherein the segment includes an inter-frame gap according to the asynchronous protocol.

4. The communication system of claim 1 wherein the segment includes an idle period according to the asynchronous protocol.

5. The communication system of claim 1 wherein the first channel is a free space optical system.

6. The communication system of claim 1 wherein the receiving unit includes
    a first interface unit coupled to the first channel;
    a controller unit coupled to the first interface unit; and
    a second interface unit coupled to the second channel.

7. The communication system of claim 6 wherein the controller unit includes:
    a first processor to process control data; and
    a second processor coupled to the first processor and the first interface unit, wherein the second processor is capable of transferring control data between the first interface unit and the first processor.

8. The communication system of claim 7 wherein the second processor is further capable of transferring control data between the second interface unit and the first processor.

9. The communication system of claim 7 wherein the second processor is further capable of transferring communications data between the first and second interface units.

10. The communication system of claim 6 wherein the first interface unit is capable of transmitting an optical signal via free space.

11. The communication system of claim 10 wherein the second channel is a wired channel.

12. A method for use in a communication system, the communication system having a first channel to support transmission according to an asynchronous protocol, the method comprising:
    detecting a first segment in a first data stream to be transmitted in the first channel, wherein the first segment is specified as unused for communications data according to the asynchronous protocol and wherein the first data stream includes communications data transmitted in a grouping of the first data stream that complies with the asynchronous protocol;
    transmitting the first data stream in the first channel, wherein the first data stream includes control data being transmitted within the first segment;
    receiving a second data stream from the first channel, the second data stream containing control data and communications data, the communications data being in a first grouping that complies with the asynchronous protocol and the control data being in a second segment that is specified as being unused for data according to the asynchronous protocol;
    extracting control data from the second segment;
    extracting the communications data from the first grouping; and
    transmitting in a second channel the extracted communications data in a second grouping that complies with the asynchronous protocol.

13. The method of claim 12 wherein the asynchronous protocol conforms to an Ethernet standard and the grouping is a frame according to the Ethernet standard.

14. The method of claim 13 wherein the first segment is an inter-frame gap according to the asynchronous protocol.

15. The method of claim 13 wherein the first segment is an idle period.

16. The method of claim 12 wherein the asynchronous protocol conforms to an Ethernet standard, the second grouping is a frame according to the Ethernet standard and the second segment is an inter-frame gap according to the Ethernet standard.

17. The method of claim 12 wherein the asynchronous protocol conforms to an Ethernet standard, the second grouping is a frame and the second segment is an idle period according to the Ethernet standard.

18. An apparatus for use in a communication system, the communication system having a first channel to support transmission according to an asynchronous protocol, the apparatus comprising:
    means for detecting a first segment in a first data stream to be transmitted in the first channel, wherein the first segment is specified as unused for data according to the asynchronous protocol;
    means for transmitting the first data stream in the first channel, wherein the first data stream includes control data being transmitted within the first segment;
    means for receiving a second data stream from the first channel, the second data stream containing control data and communications data, the communications data being in a first grouping that complies with the asynchronous protocol and the control data being in a second segment that is specified as being unused for data according to the asynchronous protocol;
    means for extracting control data from the second segment;
    means for extracting the communications data from the first grouping; and
    means for transmitting in a second channel the extracted communications data in a second grouping that complies with the asynchronous protocol.

19. The apparatus of claim 18 wherein the first data stream includes communications data transmitted in a grouping of the first data stream that complies with the asynchronous protocol.

20. The apparatus of claim 19 wherein the asynchronous protocol conforms to an Ethernet standard and the grouping is a frame according to the Ethernet standard.

21. The apparatus of claim 18 wherein the first segment is an inter-frame gap according to the asynchronous protocol.

22. The apparatus of claim 18 wherein the first segment is an idle period according to the asynchronous protocol.

* * * * *